US011527157B2

(12) United States Patent
Donovan et al.

(10) Patent No.: US 11,527,157 B2
(45) Date of Patent: Dec. 13, 2022

(54) METHOD FOR TRAFFIC CONTROL ENTITY FOR CONTROLLING VEHICLE TRAFFIC

(71) Applicant: Telefonaktiebolaget LM Ericsson (publ), Stockholm (SE)

(72) Inventors: Craig Donovan, Bromma (SE); Elena Fersman, Stockholm (SE); Rafia Inam, Västerås (SE); Sébastien Pierrel, Sundbyberg (SE); Vlasios Tsiatsis, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 168 days.

(21) Appl. No.: 16/081,287

(22) PCT Filed: Mar. 4, 2016

(86) PCT No.: PCT/EP2016/054635
§ 371 (c)(1),
(2) Date: Aug. 30, 2018

(87) PCT Pub. No.: WO2017/148531
PCT Pub. Date: Sep. 8, 2017

(65) Prior Publication Data
US 2019/0035269 A1    Jan. 31, 2019

(51) Int. Cl.
*G08G 1/0965* (2006.01)
*G08G 1/00* (2006.01)
(Continued)

(52) U.S. Cl.
CPC ........... *G08G 1/0965* (2013.01); *B60W 30/09* (2013.01); *G05D 1/0055* (2013.01);
(Continued)

(58) Field of Classification Search
CPC ....... G08G 1/0965; G08G 1/22; B60W 30/09; G05D 1/0055; G05D 1/0293; G05D 2201/0213; H04W 4/46; H04W 4/44
See application file for complete search history.

(56) References Cited

U.S. PATENT DOCUMENTS 8,352,111 B2 *   1/2013   Mudalige ............... G08G 1/164
                                                    342/458
9,792,822 B2 *  10/2017   Hiroma ................... H04L 67/12
(Continued)

FOREIGN PATENT DOCUMENTS

CN    104882010 A    9/2015
CN    104882019 A    9/2015
(Continued)

OTHER PUBLICATIONS

Machine Translation of DE-102011102024-A1 description (Year: 2012).*
(Continued)

*Primary Examiner* — Mahmoud S Ismail
*Assistant Examiner* — Gabriel Anfinrud
(74) *Attorney, Agent, or Firm* — Rothwell, Figg, Ernst & Manbeck, P.C.

(57) ABSTRACT

A method and a traffic control entity (100) for controlling a group of vehicles (104) capable of autonomous driving without requiring a driver, to allow an emergency vehicle (102) to pass the group of vehicles (104) which are travelling concurrently in multiple lanes on a road. When detecting that the emergency vehicle (102) is approaching the group of vehicles (104) e.g. from behind, the vehicles in the group (104) are identified based on information (108) about current position and movement of the vehicles (104). The traffic control entity (100) then issues a command (106) instructing the identified vehicles to adjust their lateral positions relative the lanes to create a passage along the group of vehicles
(Continued)

(104). Thereby, the emergency vehicle (102) is able to move through the passage without having to slow down significantly.

24 Claims, 8 Drawing Sheets

(51) Int. Cl.
    *B60W 30/09*    (2012.01)
    *G05D 1/00*    (2006.01)
    *G05D 1/02*    (2020.01)
    *H04W 4/46*    (2018.01)
    *H04W 4/44*    (2018.01)

(52) U.S. Cl.
    CPC ............. *G05D 1/0293* (2013.01); *G08G 1/22* (2013.01); *G05D 2201/0213* (2013.01); *H04W 4/44* (2018.02); *H04W 4/46* (2018.02)

(56) References Cited

U.S. PATENT DOCUMENTS

| | | | | |
|---|---|---|---|---|
| 2008/0012726 A1* | 1/2008 | Publicover | ....... | G08G 1/096725 340/932 |
| 2011/0102202 A1* | 5/2011 | Lin | ...... | G08G 1/0965 340/988 |
| 2012/0323474 A1* | 12/2012 | Breed | ............ | B60W 30/18154 701/117 |
| 2015/0154871 A1* | 6/2015 | Rothoff | ................... | G08G 1/22 701/2 |
| 2015/0243165 A1* | 8/2015 | Elsheemy | ........ | G08G 1/096775 340/906 |
| 2015/0254978 A1* | 9/2015 | Mawbey | .................. | B60Q 1/52 340/902 |
| 2015/0307131 A1* | 10/2015 | Froeschl | .............. | B62D 15/025 701/25 |
| 2015/0321698 A1* | 11/2015 | Fuehrer | ................ | G08G 1/0965 701/41 |
| 2015/0358481 A1* | 12/2015 | Nagata | .................... | H04W 4/44 370/259 |
| 2017/0364069 A1* | 12/2017 | Colella | ................... | H04W 4/02 |

FOREIGN PATENT DOCUMENTS

| | | | | |
|---|---|---|---|---|
| CN | 105160903 A | | 12/2015 | |
| DE | 10 2011 102024 A1 | | 4/2012 | |
| DE | 102011102024 A1 | * | 4/2012 | ............ G08G 1/087 |
| WO | 2015/068501 A1 | | 5/2015 | |

OTHER PUBLICATIONS

Machine Translation of DE-102011102024-A1 description (Year: 2012), Attached to original.*
Machine Translation of DE-102011102024-A1 description, Attached to original (Year: 2012).*
Machine translation of DE102011102024 (Year: 2012).*
International Search Report and Written Opinion dated Nov. 2, 2016 issued in International Patent Application No. PCT/EP2016/054635 (8 pages).

* cited by examiner

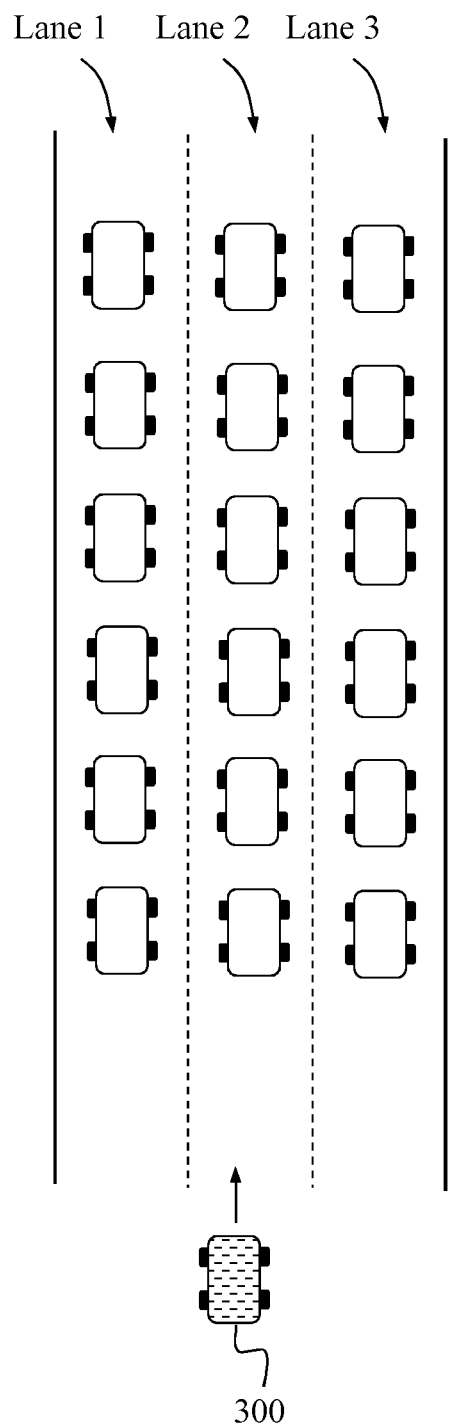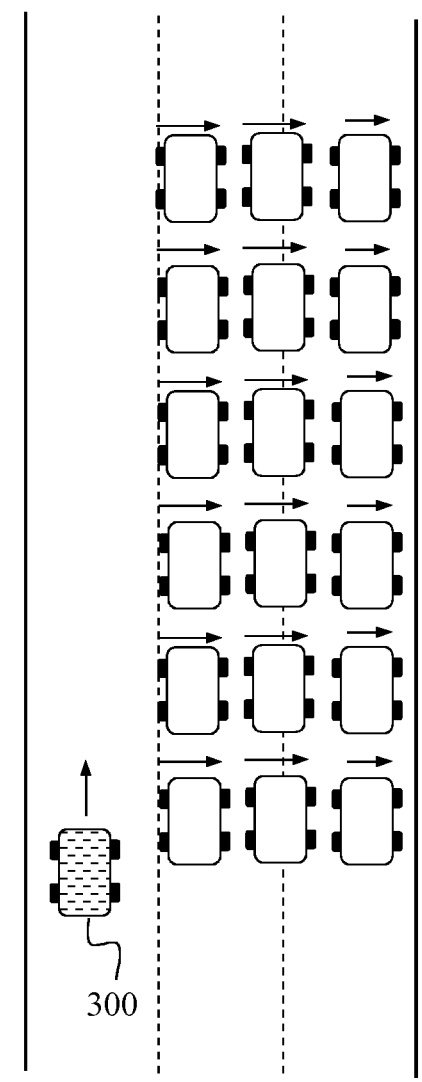
Fig. 4A
Fig. 4B

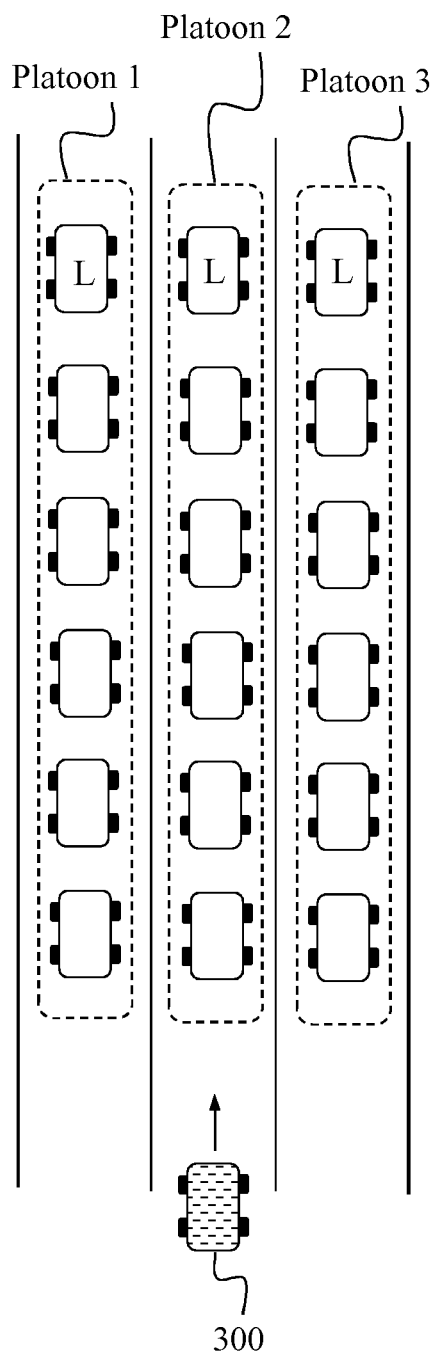
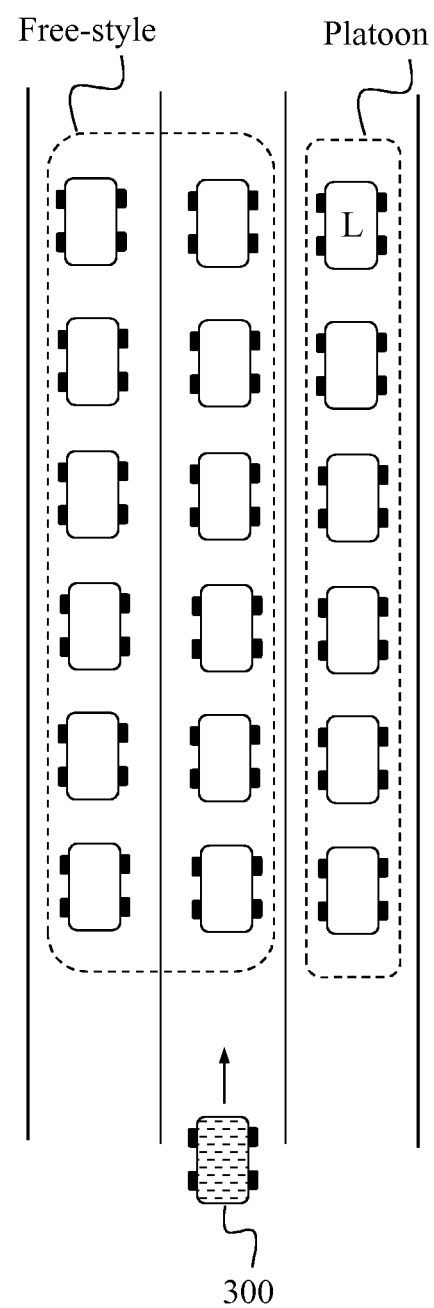
Fig. 5A
Fig. 5B

METHOD FOR TRAFFIC CONTROL ENTITY FOR CONTROLLING VEHICLE TRAFFIC

CROSS REFERENCE TO RELATED APPLICATION(S)

This application is a 35 U.S.C. § 371 National Stage of International Patent Application No. PCT/EP2016/054635, filed Mar. 4, 2016, designating the United States.

TECHNICAL FIELD

The present disclosure relates generally to a method and a traffic control entity, for controlling a group of vehicles travelling concurrently on a road to create a passage through the group of vehicles allowing an emergency vehicle to pass the group of vehicles through said passage.

BACKGROUND

Emergency vehicles such as ambulance, fire brigade and police vehicles frequently need to travel on public roads at considerably higher speed than other vehicles in order to arrive as soon as possible at some location, e.g. where there has been an accident or other incident requiring emergency personnel. When an emergency vehicle is travelling on a road such as a highway with multiple lanes, it frequently happens that the road is blocked by other vehicles driving in the same direction but considerably slower than the emergency vehicle. In this case the emergency vehicle needs to pull ahead, i.e. pass, the blocking vehicles, which typically requires the vehicles to pull aside in order to make room for the emergency vehicle to pass. The emergency vehicle typically emits both audio signals from a siren and visual signals such as flashing lights in order to catch the attention of the vehicle drivers and indicate that they must slow down and move aside to make room for the emergency vehicle.

However, it may take some time before the drivers have reacted and managed to create sufficient room for the emergency vehicle, and some inattentive drivers may react very slowly or not at all. In particular, it is difficult for the drivers to make room promptly in case of rush situations on the roads when the road is already packed with vehicles. Furthermore, even though most vehicles may move aside alright there is frequently at least one blocking vehicle whose driver is very slow to react such that the emergency vehicle has to virtually stop and wait until that vehicle has moved sufficiently for the emergency vehicle to pass.

It is thus a well-known problem that emergency vehicles in need of travelling fast are frequently blocked by other vehicles on public roads, particularly during dense traffic and/or congestion, which may ultimately result in too late arrival with very serious or even fatal consequences depending on the incident. Another problem is that the traffic flow can be seriously disturbed when an emergency vehicle tries to pass other vehicles, which may aggravate or cause a congestion or traffic jam. Yet another problem is that the risk for collision may increase substantially when an emergency vehicle tries to pass other vehicles, due to haphazard and irrational behavior of the vehicles. The driver of the emergency vehicle may also take great risks when serious consequences or even life may be at stake.

SUMMARY

It is an object of embodiments described herein to address at least some of the problems and issues outlined above. It is possible to achieve this object and others by using a method and a traffic control entity as defined in the attached independent claims.

According to one aspect, a method is performed by a traffic control entity for controlling a group of vehicles capable of autonomous driving without requiring a driver, to allow an emergency vehicle to pass the group of vehicles which are travelling concurrently in multiple lanes on a road. In this method the traffic control entity detects that the emergency vehicle is approaching the group of vehicles, and identifies the vehicles in the group based on information about current position and movement of the vehicles in the group. The traffic control entity then issues a command instructing the identified vehicles to adjust their lateral positions relative the lanes to create a passage along the group of vehicles so as to allow the emergency vehicle to move through said passage.

Thereby, the emergency vehicle is not seriously hindered and can pass the other vehicles at fairly high speed in a safe manner. Any disturbances in the traffic flow caused by the emergency vehicle may be reduced or minimized and the risk for collision when the emergency vehicle passes may also be reduced.

According to another aspect, a traffic control entity is arranged to control a group of vehicles capable of autonomous driving without requiring a driver, to allow an emergency vehicle to pass the group of vehicles when the vehicles in the group are travelling concurrently in multiple lanes on a road. The traffic control entity is configured to detect, e.g. by means of by a detecting unit, that the emergency vehicle is approaching the group of vehicles. The traffic control entity is also configured to identify, e.g. by means of by an identifying unit, the vehicles in the group based on information about current position and movement of the vehicles in the group. The traffic control entity is further configured to issue, e.g., by means of a command unit, a command instructing the identified vehicles to adjust their lateral positions relative the lanes to create a passage along the group of vehicles so as to allow the emergency vehicle to move through said passage.

A computer program storage product is also provided comprising instructions which, when executed on at least one processor in the score management node, cause the at least one processor to carry out the method described above for the score management node. A computer program is also provided comprising instructions which, when executed on at least one processor in the score management node, cause the at least one processor to carry out the method described above for the score management node.

The above method and traffic control entity may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which:

FIGS. 4A-4B illustrate another example of how a group of vehicles are instructed to move laterally, according to further example embodiments FIGS. 5A-5B illustrate some examples of how platoons may be defined for a group of vehicles, according to further example embodiments.

DETAILED DESCRIPTION

Figure 1:
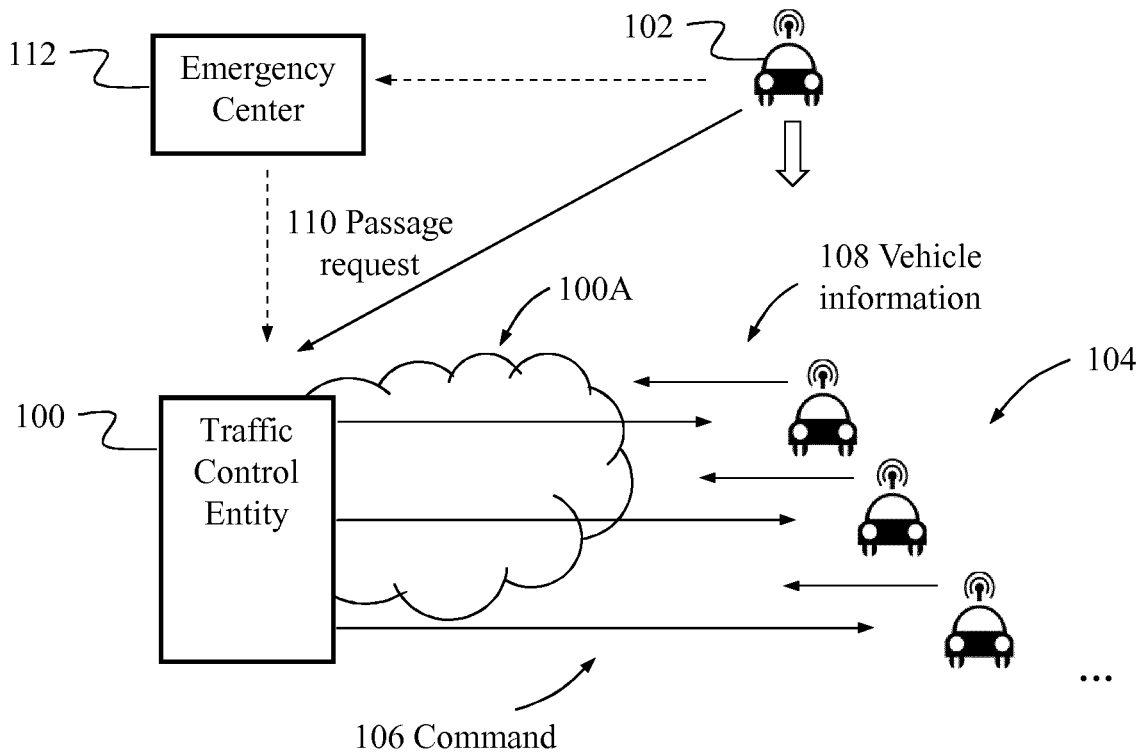
FIG. 1 is a communication scenario illustrating an example of how the solution may be employed, according to some example embodiments.

Briefly described, a solution is provided to create room on a road with multiple lanes, to enable an emergency vehicle to pass a group of vehicles travelling on the road e.g. with lower speed or in another direction than the emergency vehicle, so that the emergency vehicle is not seriously hindered and can keep a fairly high speed when passing the other vehicles. The solution also enables less disturbances in the traffic flow and reduced risk for collision when the emergency vehicle passes, as compared to conventional procedures.

Throughout this disclosure the term "emergency vehicle" is used in a broad sense to denote any vehicle in need of travelling fast on a road such that other vehicles on the road may need to make room for the emergency vehicle to pull ahead or otherwise pass the other vehicles. The emergency vehicle in this context may, without limitation, be an ambulance, fire brigade or police vehicle. It could also be any other vehicle that has been given permission to drive faster than what is required by normal speed regulations, for whatever reason. The solution may thus be employed for any vehicle that needs to pass a group of vehicles basically blocking the road, which could generally provide for less traffic congestions and better utilization of a road infrastructure. The emergency vehicle described herein may or may not emit sound or light signals to indicate emergency, which is however outside the scope of this disclosure.

In this solution and various embodiments to be described herein, it is assumed that the vehicles that need to make room for the emergency vehicle are capable of autonomous driving without requiring manipulation by a human driver, where the term "autonomous driving" implies automatic control of the vehicles' movements on a road including steering and speed. It is generally foreseen that most road vehicles in the future will be semi- or fully autonomous vehicles. Semi-autonomous vehicle implies that the vehicle is partly driven by a human driver and partly by an automatic control entity or "machine", while fully autonomous vehicle implies that the vehicle is wholly driven by automatic control from a control entity without any manipulation by a human driver. In the future, public roads will likely be populated by a mix of manual, semi-autonomous and fully autonomous vehicles although virtually all vehicles are expected to be equipped with autonomous driving capabilities. Such a vehicle is thus capable of autonomous driving but its operation, or "state", might be manual, semi-autonomous or fully autonomous.

The vehicles in the future will thus be driven with the assistance of semi- or fully autonomous functionality, and so-called "platooning" will also be frequently used. Platooning refers to a mode of operation of a group of vehicles which can travel in a line very close to each other, and they can autonomously steer, accelerate and brake in a coordinated manner, as controlled by means of a lead vehicle of the platoon. Such a platoon can generally be formed in any part of a road or highway where there are enough vehicles to motivate the use of the platooning mode. Autonomous or semi-autonomous vehicles can be operated in the platooning mode as long as they are equipped with communication technology needed for receiving commands and sending vehicle information related to position and movement, and also with software needed for platooning formation.

The solution and embodiments thereof will be described herein in terms of functionality in a "traffic control entity" which is basically configured to control the driving of vehicles, e.g. by issuing commands instructing the vehicles to adjust their positions on a road. The embodiments herein may be applied for any vehicles capable of autonomous driving without requiring a driver, which may include vehicles operating in a platoon, referred to as "platoon vehicles", and so-called "free-style vehicles" which is a term used herein to represent vehicles that are not operating in a platoon. The solution may thus be employed for a group of vehicles that may comprise only platoon vehicles, or only free-style vehicles, or a mix of both platoon vehicles and free-style vehicles.

A simplified communication scenario illustrating how the solution may be employed, is shown in FIG. 1 involving a traffic control entity 100, an emergency vehicle 102 and a group of other vehicles 104 which are travelling concurrently in multiple lanes on a road, not shown. The vehicles 102, 104 are depicted with an antenna on the roof to indicate ability of radio communication. For example, the traffic control entity 100 may be implemented in a suitable node of a communication network, or in a separate stand-alone node, or as a distributed entity in a "cloud"-like environment, or in a vehicle. The traffic control entity 100 is capable of communicating with vehicles in the manner described herein, e.g. over a mobile network 100A. It is assumed that the vehicles 104 are somehow potentially blocking the way for the emergency vehicle 102 so that they must move aside to let the emergency vehicle 102 pass.

In short, when it is detected that the emergency vehicle 102 is approaching the group of vehicles 104 e.g. from behind or from any other direction, the traffic control entity 100 issues a command 106 instructing the vehicles 104 in the group to adjust their lateral positions relative the lanes to create a passage which allows the emergency vehicle 102 to move through the passage and pass the group of vehicles 104. Some examples of how such a passage could be created will be described later below. The vehicles' adjustment of lateral position in response to the command 106 is thus wholly automatic and could be performed using already developed technique for autonomous driving which is deemed to be very accurate and safe even though the distance between two vehicles can be just a few centimeters.

The traffic control entity 100 also identifies which vehicles to include in the group based on information about current position and movement of the respective vehicles 104. This vehicle information may be received from the vehicles 104 themselves, as indicated by numeral 108, e.g. by means of a positioning function or center in the mobile network 100A capable of determining said position and movement of the vehicles. Further, the traffic control entity 100 may be triggered to issue the command 106 when receiving a request 110 for creating a passage, denoted "passage request", or when a current position and movement of the emergency vehicle 102 relative the group of vehicles 104 indicate the need for creating such a passage.

In the former case, the passage request 110 may be received directly from the emergency vehicle 102 as indicated by a full arrow, or from an emergency center 112 associated with the emergency vehicle 102, which emergency center 112 may have received an indication from the emergency vehicle 102 that it needs to pass the group of vehicles 104, the latter scenario being indicated by dashed arrows. This indication may e.g. be triggered manually by the driver of the emergency vehicle 102. Alternatively, the emergency center 112 may have noticed that the emergency vehicle 102 needs to pass the vehicles 104 based on information about the vehicles' 102, 104 relative positions and movements which in turn may have been obtained from the vehicles themselves or from a positioning center or the like, not shown. It is also possible that the emergency vehicle 102 is currently driving autonomously being controlled by the traffic control entity 100, just like the other vehicles 104.

An example will now be described, with reference to the flow chart in FIG. 2, of how the solution may be employed in terms of actions performed in a traffic control entity, e.g. the above-described traffic control entity 100, for controlling a group of vehicles capable of autonomous driving without requiring a driver, to allow an emergency vehicle to pass the group of vehicles. In this procedure, the group of vehicles is travelling concurrently in multiple lanes on a road. Reference will also be made, without limiting the features described, to the example shown in FIG. 1. The procedure illustrated by FIG. 2 can thus be used to accomplish the functionality described above for the traffic control entity 100.

A first action 200 illustrates that the traffic control entity 100 detects that the emergency vehicle 102 is approaching the group of vehicles 104. In some possible examples, it may be detected that the emergency vehicle 102 is approaching the vehicles 104 from behind when driving in the same direction on the road, or from any other direction e.g. opposite or crossing the road. In a next action 202, the traffic control entity 100 identifies the vehicles in the group 104 based on information about current position and movement of the vehicles in the group 104. A final action 204 illustrates that the traffic control entity 100 issues a command 106 instructing the identified vehicles to adjust their lateral positions relative to the lanes to create a passage along the group of vehicles 104, so as to allow the emergency vehicle 102 to move through said passage.

Thereby, it may not be necessary for the emergency vehicle 102 to slow down noticeably when passing the group of vehicles 104 through the created passage, while the risk for collision or touching amongst the vehicles 104 could be substantially reduced or even virtually eliminated. Much time can thus be saved for the emergency vehicle 102 when traveling on the road, as compared to conventional procedures. The impact on traffic flow by the passing emergency vehicle 102 is also reduced and the solution may generally provide better utilization of the road infrastructure. The emergency vehicle 102 may employ autonomous driving as well when passing through the created passage such that the risk for touching any of the other vehicles 104 can be likewise reduced or minimized.

Some non-limiting example embodiments that can be used in the above procedure, will now be described. In an example embodiment, the command instructs vehicles travelling in a first set of lanes to move laterally away from vehicles travelling in a second set of lanes such that the passage is created between the first and second sets of lanes, each of the first and second sets of lanes comprising at least one of said lanes on the road. In another example embodiment, the command instructs the vehicles travelling in the first set of lanes to move in a first lateral direction and the vehicles travelling in the second set of lanes to move in a second lateral direction opposite to the first lateral direction.

FIGS. 3A-3D illustrate an example of how the above two embodiments may be implemented when the road comprises three lanes 1-3 in which three rows of vehicles are currently travelling in a concurrent manner. In this context the term "concurrently" implies that the vehicles travel more or less together with basically the same speed so as to form the above-mentioned group of vehicles 104 that collectively block the road for an approaching emergency vehicle denoted 300 in this example.

Figure 3A:
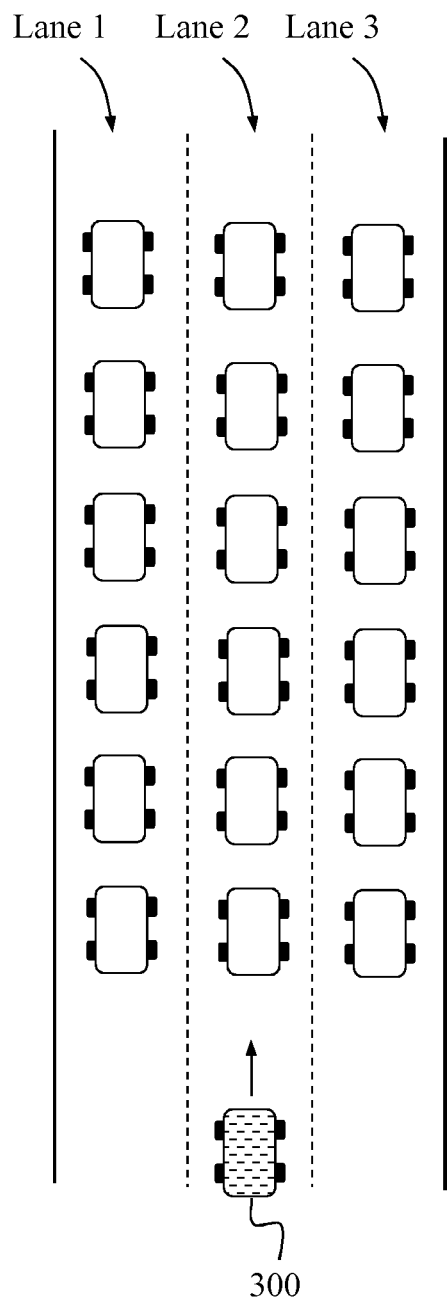
FIGS. 3A-3D illustrate an example of how a group of vehicles is instructed to move laterally, according to further example embodiments.
Figure 3B:
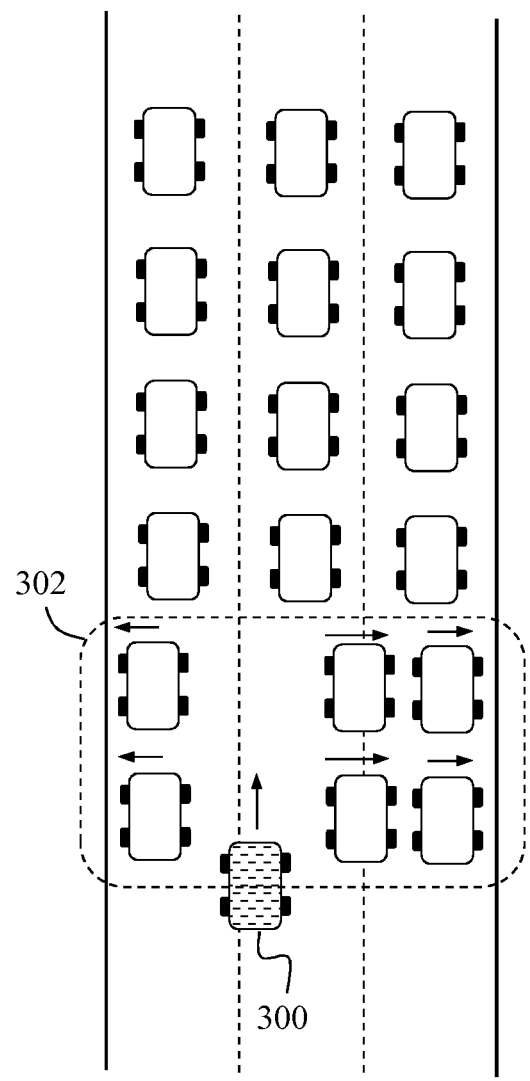
Figure 3C:
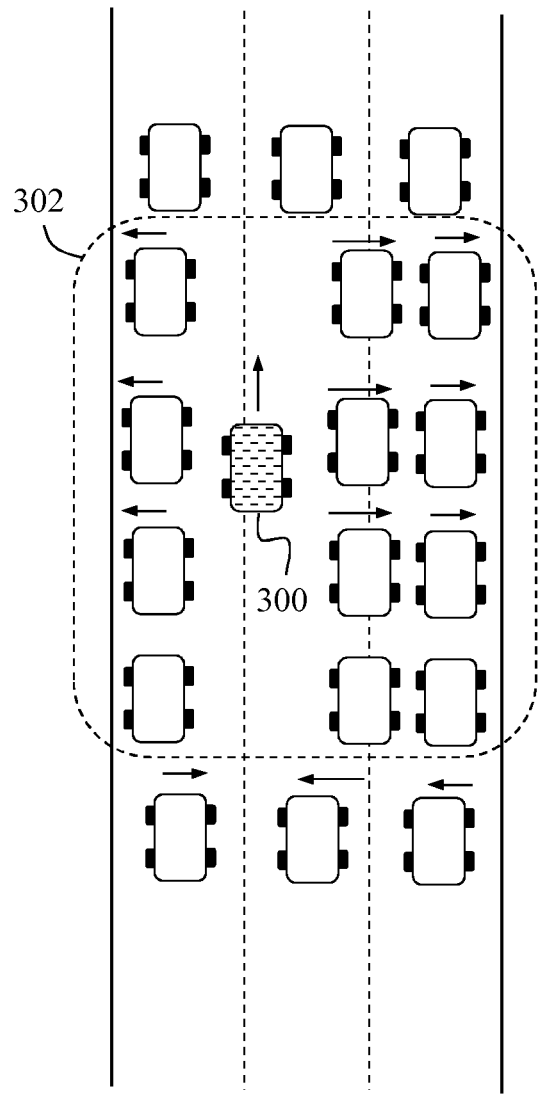
Figure 3D:
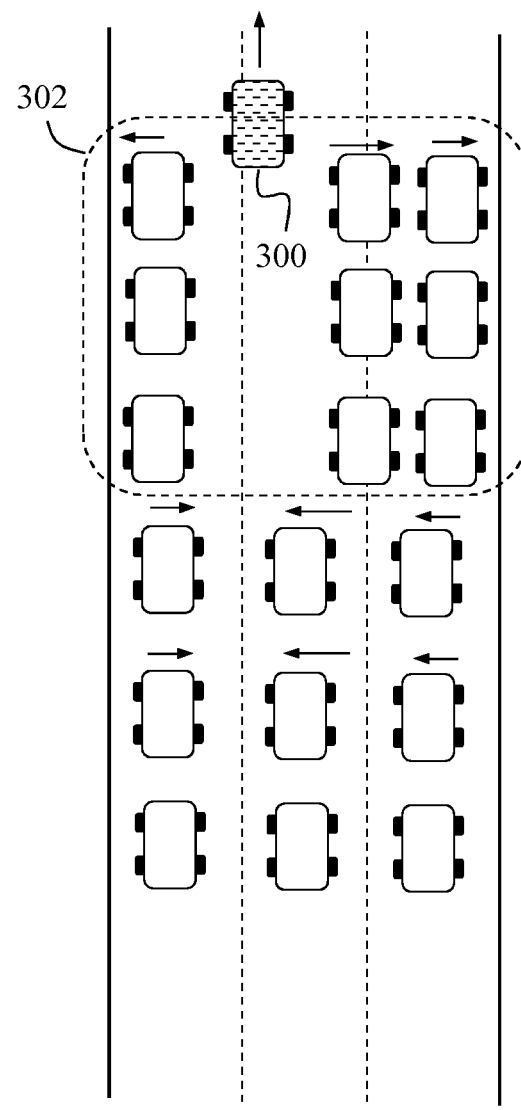

In terms of the above embodiments, lane 1 corresponds to the first set of lanes and lanes 2-3 correspond to the second set of lanes. In response to the command 106 issued by the traffic control entity 100 in action 204, the vehicles travelling in lane 1 will move laterally away from the vehicles travelling in lanes 2-3, as indicated by arrows pointing to the left in FIGS. 3B-D. Correspondingly, the vehicles travelling in lanes 2-3 will move laterally away from the vehicles travelling in lane 1, as indicated by lateral arrows pointing to the right in FIGS. 3B-D. Thereby, a passage is created through which the emergency vehicle 300 can travel along the vehicles 104. In this example, the passage is created by an opening, or "bubble", as indicated by a dashed field 302, which gradually propagates through the group of vehicles 104 until the emergency vehicle 300 has passed all vehicles as shown in FIG. 3D. It may not be necessary that the vehicles in all lanes of a road move laterally, and in FIGS. 3A-D it may e.g. be sufficient that only the vehicles in lanes 1 and 2 move away from each other to create a large enough passage between lanes 1 and 2, while the vehicles in lane 3 could stay in their normal lane positions.

Another possibility is that all the vehicles 104 in a group move laterally basically at the same time, instead of moving successively as shown in the figures, such that the entire passage along all vehicles 104 is open when the emergency vehicle 300 enters the passage. FIGS. 3C and 3D also illustrates that the vehicles move to normal positions in the lanes 1-3 after the emergency vehicle 300 has passed the respective vehicles, as indicated by arrows pointing to the right for the vehicles travelling in lane 1, and by arrows pointing to the left for the vehicles travelling in lanes 2 and 3.

In another example embodiment, the command may instruct all vehicles in the group 104 to move laterally in the same direction such that the passage is created on one side of the group of vehicles 104. FIGS. 4A-4B illustrate an example of how the latter embodiment may be implemented, the road again comprising three lanes 1-3 in which three corresponding rows of vehicles are currently travelling in a concurrent manner. In this example, all vehicles 104 move laterally to the right such that the passage is created on the left side of the group of vehicles 104, basically opening the passage in lane 1. FIG. 4B also illustrates that the vehicles 104 move laterally basically at the same time, although they could also move successively.

In another example embodiment, the information about current position and movement of the vehicles may be received from the vehicles when detected by a positioning function in the respective vehicles, e.g. a GPS unit or the like. The "movement" information may include speed, acceleration/deceleration and direction, which information could be derived by means of the positioning function combined with an accelerometer or the like. The above vehicle information may also include vehicle proximity distance information which may be derived from distance measurements by ultrasound or laser sensors.

In further example embodiments, the detecting of the approaching emergency vehicle in action 200 may be performed by receiving a passage request 110 from the emergency vehicle 102 or from an emergency center 112 associated with the emergency vehicle 102. Alternatively or additionally, this detecting may be performed by obtaining a current position and movement of the emergency vehicle 104 relative the group of vehicles 102. As said above, the vehicles' 102, 104 relative positions and movements may be obtained from the vehicles themselves or from a positioning center or the like.

FIG. 5A illustrates an example where three lanes of a road are populated by vehicles driving in platoons, in this case one platoon is driving in each lane although a platoon could also populate two or more lanes. FIG. 5B illustrates another example where two of the lanes are populated by free-style vehicles not driving in a platoon while the third lane populated by vehicles driving in a platoon. The vehicles in the respective platoons are controlled from a lead vehicle denoted L that may be driving ahead of the other vehicles of the respective platoon. The general concept and role of a lead vehicle in a platoon is well-known in this field.

In another example embodiment, the group of vehicles 104 may comprise platoon vehicles operating in a platoon controlled by a lead vehicle L, and in that case the traffic control entity 100 may send the command 106 to the lead vehicle L which is thereby enabled to forward the command to the platoon vehicles in the respective platoon.

In another example embodiment, the platoon vehicles may be operating in at least two platoons, each platoon being controlled by a lead vehicle L, e.g. as in the example of FIG. 5A. In this embodiment, the traffic control entity 100 will send the command 106 to each lead vehicle L of the platoons such that the lead vehicles L can forward the command to their respective platoon vehicles. In another example embodiment, when any of the latter two embodiments is employed, information about current position and movement of the platoon vehicles may be received from the lead vehicle(s) L. In that case the position and movement information may be sent from the platoon vehicles to their lead vehicle L, using Vehicle-to-Vehicle, V2V, communication involving a suitable local radio link between the vehicles, or using Vehicle-to-Infrastructure, V2I, communication over the mobile network 100A.

In another example embodiment, at least some of the vehicles in the group 104 may be free-style vehicles not operating in a platoon, and in this case the traffic control entity 100 will send the command to each of the free-style vehicles. It should be noted that FIGS. 4A,B and 5A,B are simplified schematic illustrations and that the embodiments described herein may be used for any other possibly more complex combinations and arrangements of vehicle platoons and free-style vehicles.

In another example embodiment, before issuing the command 106 the traffic control entity 100 may instruct the vehicles in the group 104 to enter emergency mode where said vehicles are configured to act according to the command autonomously without requiring a driver. Once the emergency vehicle has passed the group and all vehicles have returned to their normal positions in the lanes, the group of vehicles 104 may exit the emergency mode and keep on driving as before. The emergency mode of this embodiment may be employed for both free-style vehicles and platoon vehicles and independently of the above-described platooning mode.

In another example embodiment, the traffic control entity 100 may instruct the vehicles to move to normal positions in the lanes after the emergency vehicle 102 has passed the respective vehicles. Examples of this embodiment have been described above with reference to FIGS. 3C, 3D. In another example embodiment, the traffic control entity 100 may receive an indication for each vehicle that the emergency vehicle 102 has passed. This indication can thus confirm that the vehicles have performed their moving operation and the traffic control entity 100 can thus instruct the vehicles to move to normal positions in the lanes as of the previous embodiment.

An example of how the solution may be employed in practice when both vehicle platoons and free-style vehicles are involved will now be described with reference to the signaling diagram in FIG. 6. This figure illustrates a traffic control entity 600, two or more lead vehicles 602 controlling respective platoon vehicles 604, various free-style vehicles 606 and an emergency vehicle 608. It is assumed that the lead vehicles 602, the platoon vehicles 604 and the free-style vehicles 606 are comprised in a group of vehicles as described herein. The entities and vehicles in this figure correspond to the above-described traffic control entity 100, lead vehicles L, platoon and free-style vehicles 104 and emergency vehicle 102.

To mention a few examples, a vehicle platoon as used herein may be comprised of vehicles from one and the same manufacturer, although a platoon with vehicles from different manufacturers is also possible. Different vehicle manufacturers may have their own connected car cloud platform referred to as a Manufacturer Vehicle Cloud, MVC, or the vehicles may send vehicle data and receive commands to/from a Traffic Authority Cloud, TAC, which is a connected "car cloud" infrastructure maintained by a Traffic Authority, TA, of a certain city or country. The vehicles may thus be connected to the TAC in order to push vehicle data and receive commands, while it is also possible that each vehicle connects to the TAC through an MVC.

Figure 6:
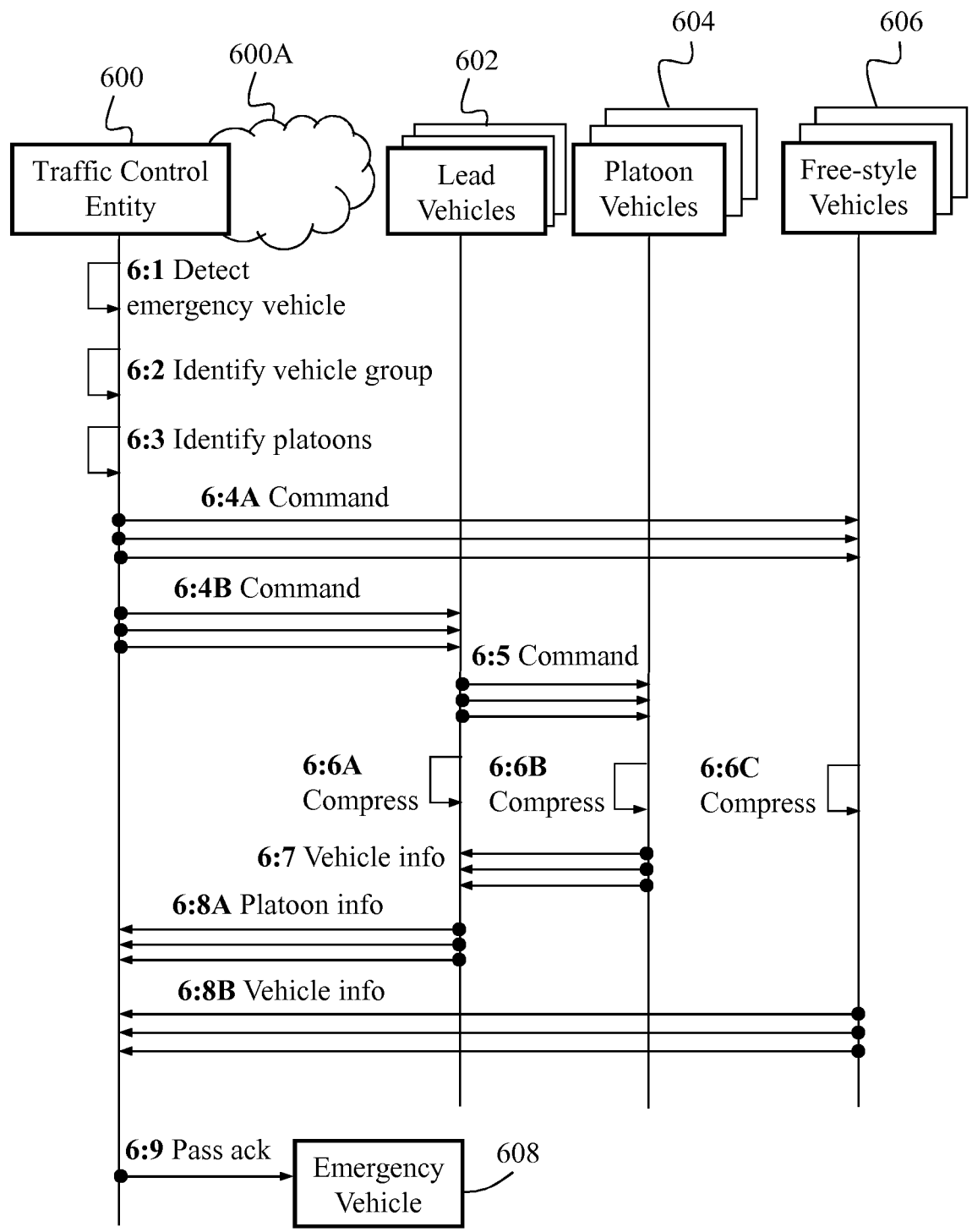
FIG. 6 is a signaling diagram illustrating an example of a procedure when the solution is used, according to further example embodiments.

FIG. 6 further illustrates that the traffic control entity 600 may be implemented in a TAC 600A which may provide for various authentication and authorization procedures that may be required, which is however outside the scope of this solution.

A first action 6:1 illustrates that the traffic control entity 600 detects that the emergency vehicle 608 is approaching the group of vehicles 602-606 e.g. from behind or other direction, corresponding to the above-described action 200. In another action 6:2, the traffic control entity 600 identifies the vehicles 602-606 in the group, corresponding to the above-described action 202. A further action 6:3 illustrates that the traffic control entity 600 also identifies the platoons and their respective lead vehicles 602.

Next the traffic control entity 600 issues a command instructing the identified vehicles to adjust their lateral positions in the manner described herein, corresponding to the above-described action 204. An action 6:4A illustrates that the traffic control entity 600 sends the command to each one of the free-style vehicles 606, while another action 6:4B illustrates that the traffic control entity 600 also sends the command to each one of the lead vehicles 602 that in turn can send the command to their respective platoon vehicles 604, as shown in action 6:5.

Having received the command, the lead vehicles 602, the platoon vehicles 604 and the free-style vehicles 606 execute the adjustment of lateral positions to make room for the emergency vehicle 608, indicated as "compress" in actions 6:6A-C, respectively. Then the platoon vehicles 604 send information about their new position and speed to their respective lead vehicles 602 in an action 6:7 and the lead vehicles 602 sends this information on to the traffic control entity 600 as "platoon information" in a following action 6:8A. Each of the free-style vehicles 606 likewise sends information about their new position and speed to the traffic control entity 600 in another action 6:8B. Finally, the traffic control entity 600 sends an acknowledgement to the emergency vehicle 608 in an action 6:9 to indicate that it is now possible to pass the group of vehicles 602-606.

Figure 7:
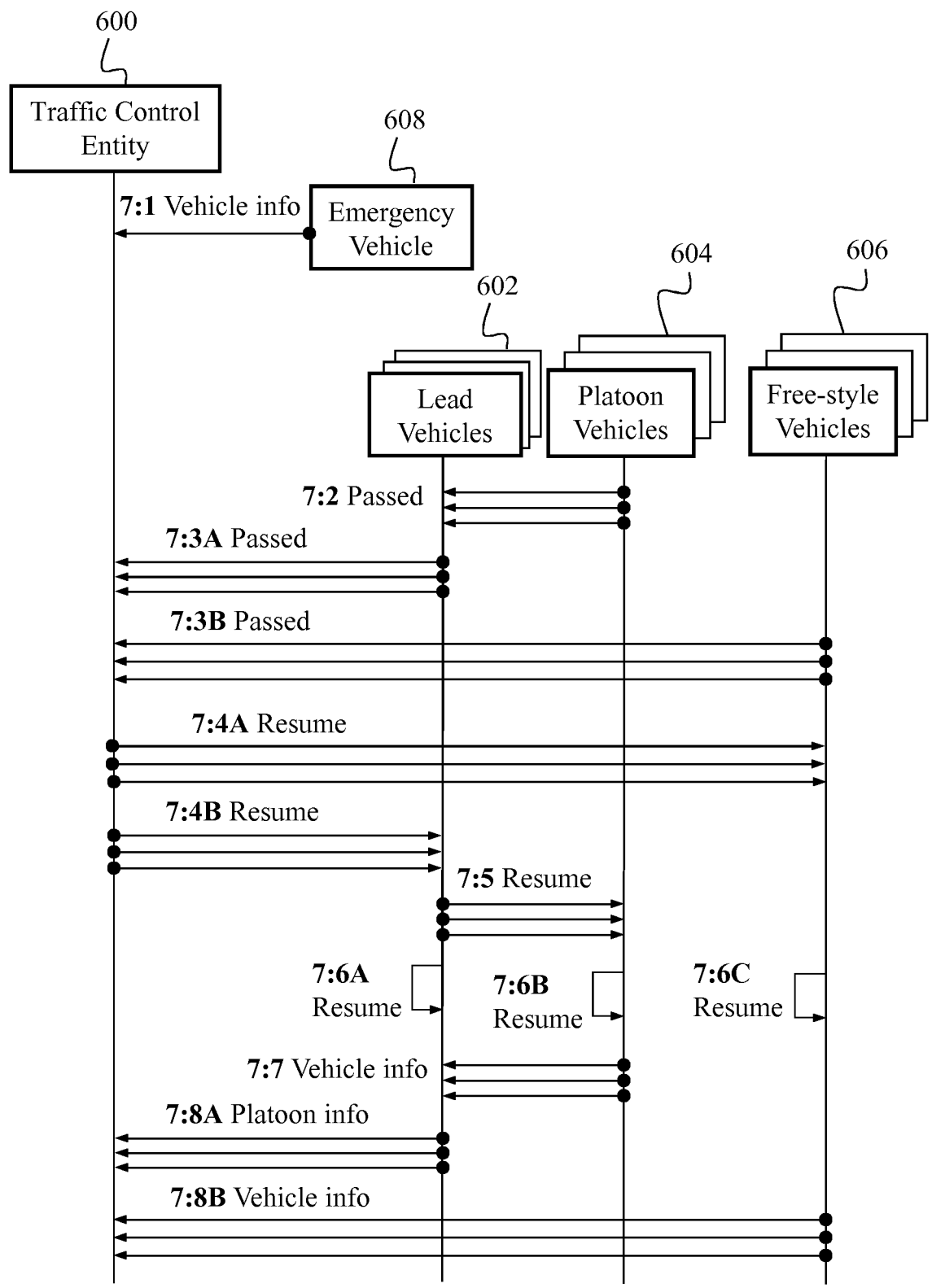
FIG. 7 is a signaling diagram illustrating another example of a procedure when the solution is used, according to further example embodiments.

The signaling diagram in FIG. 7 illustrates a procedure following the procedure of FIG. 6, i.e. what could happen after the emergency vehicle 608 has passed the group of vehicles 602-606. An action 7:1 illustrates that the emergency vehicle 608 sends information about its current position to the traffic control entity 600. In another action 7:2 the platoon vehicles 604 send an indication that the emergency vehicle 608 has passed to their respective lead vehicles 602, and the lead vehicles 602 sends this indication on to the traffic control entity 600 in a following action 7:3A. Each of the free-style vehicles 606 likewise sends an indication that the emergency vehicle 608 has passed to the traffic control entity 600 in another action 7:3B. Actions 7:1 and 7:3A-B may be seen as two alternative ways to inform the traffic control entity 600 about the passing of the emergency vehicle 608.

Being confirmed that the emergency vehicle 608 has passed all vehicles 602-606 in the group, the traffic control entity 600 instructs the vehicles 602-606 to move to normal positions in the lanes. Thus, an action 7:4A illustrates that the traffic control entity 600 sends a resume instruction to each one of the free-style vehicles 606, while another action 7:4B illustrates that the traffic control entity 600 also sends the resume instruction to each one of the lead vehicles 602 which in turn can send the resume instruction to their respective platoon vehicles 604, as shown in action 7:5.

Having received the resume instruction, the lead vehicles 602, the platoon vehicles 604 and the free-style vehicles 606 resume their normal positions in actions 7:6A-C, respectively. Then the platoon vehicles 604 send information about their current position and speed to their respective lead vehicles 602 in an action 7:7 and the lead vehicles 602 sends this information on to the traffic control entity 600 as "platoon information" in a following action 7:8A. The free-style vehicles 606 likewise send information about their current position and speed to the traffic control entity 600 in another action 7:8B.

The examples of FIGS. 6 and 7 involve both platoon vehicles 602, 604 and free-style vehicles 606. However, these examples could be modified to involve only the free-style vehicles 606 by omitting the platoon vehicles 602, 604 in the described procedures, or to involve only the platoon vehicles 602, 604 by omitting the free-style vehicles 606 in the described procedures.

It should be noted that all communication between the traffic control entity 100, 600 and the respective vehicles 102, 104 602, 606 and 608 as described herein may be performed using any existing technique for wireless communication over a mobile network, e.g. in accordance with any of 2G, 3G, 4G, LTE, or a specified network slice of 5G. Further, the communication between the lead vehicles 602 and the platoon vehicles 604 as described herein may be performed using a suitable technique for wireless V2V communication or V2I communication over a mobile network, e.g. in accordance with any of 2G, 3G, 4G, LTE, or a specified network slice of 5G, or 802.11P.

Figure 8:
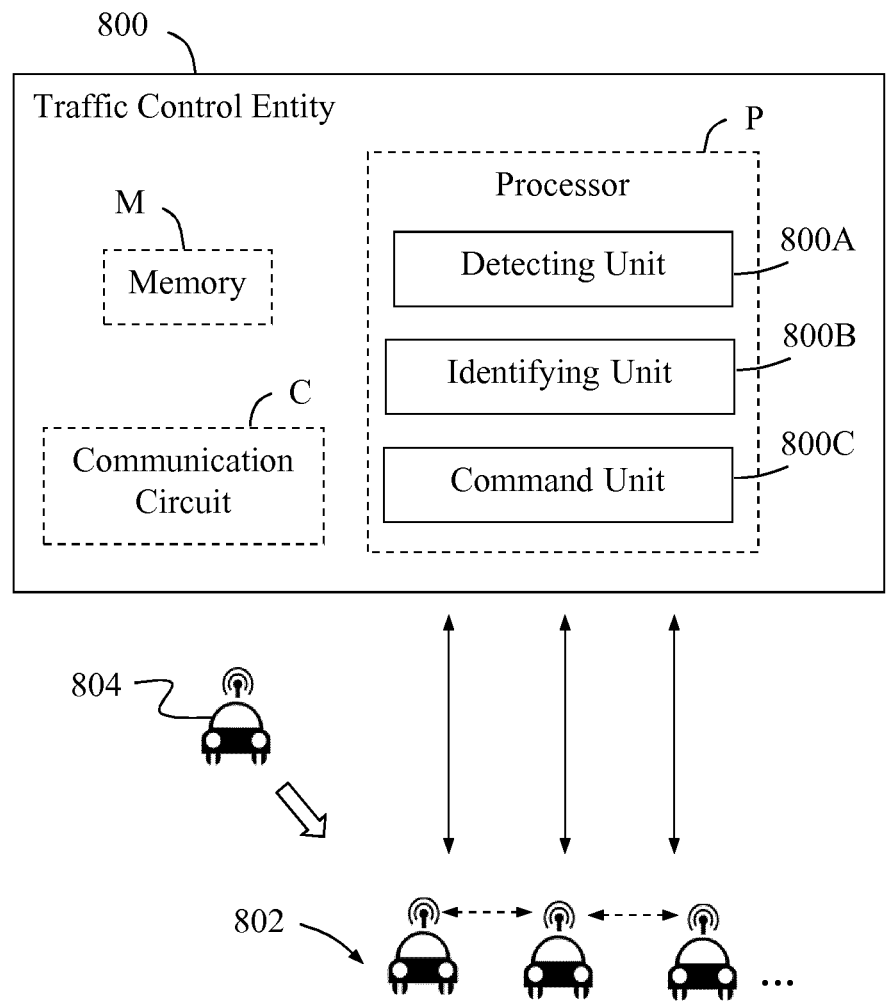
FIG. 8 is a block diagram illustrating a traffic control entity in more detail, according to further example embodiments.

The block diagram in FIG. 8 illustrates a detailed but non-limiting example of how a traffic control entity 800 may be structured to bring about the above-described solution and embodiments thereof. The traffic control entity 800 may be configured to operate according to any of the examples and embodiments of employing the solution as described above, where appropriate, and as follows. The traffic control entity 800 is shown to comprise a processor P and a memory M, said memory comprising instructions executable by said processor P whereby the traffic control entity 800 is operative as described herein. The traffic control entity 800 also comprises a communication circuit C with suitable equipment for transmitting commands and receiving information in the manner described herein.

The communication circuit C is configured for communication with vehicles using suitable protocols depending on the implementation. This communication may be performed in a conventional manner over a communication network employing radio links for wireless communication with the vehicles involved, which is not necessary to describe here as such in any detail. The solution and embodiments herein are thus not limited to using any specific types of networks, technology or protocols for radio communication and other communication.

Figure 2:
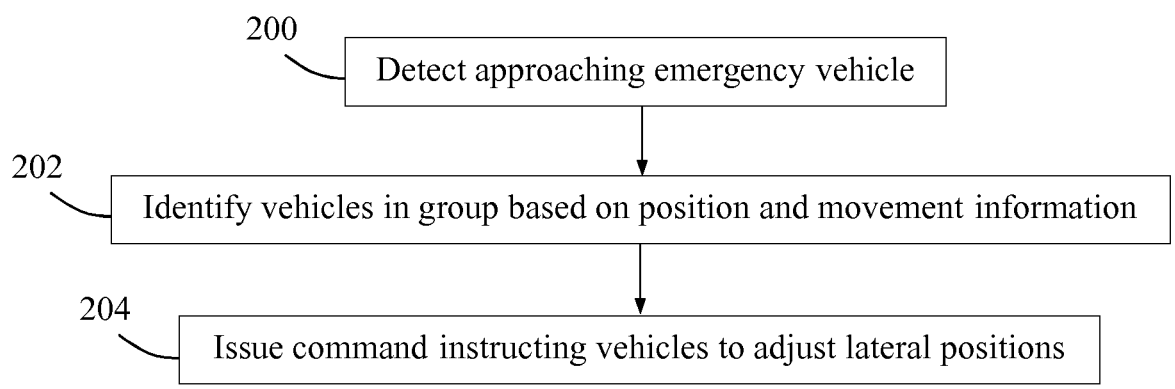
FIG. 2 is a flow chart illustrating a procedure in a traffic control entity, according to further example embodiments.

The traffic control entity 800 comprises means configured or arranged to perform at least the actions 200-204 of the flow chart in FIG. 2, and optionally also in accordance with any of the examples shown in FIGS. 6 and 7. The traffic control entity 800 is arranged to control a group of vehicles 802 capable of autonomous driving without requiring a driver, to allow an emergency vehicle 804 to pass the group of vehicles 802 when the vehicles in the group 802 are travelling concurrently in multiple lanes on a road.

The traffic control entity 800 is configured to detect that the emergency vehicle 804 is approaching the group of vehicles 802. This operation may be performed by a detecting unit 800A in the traffic control entity 800, e.g. in the manner described for action 200 above. The traffic control entity 800 is further configured to identify the vehicles 802 in the group based on information about current position and movement of the vehicles 802 in the group. This operation may be performed by an identifying unit 800B in the traffic control entity 800, e.g. as described for action 202 above.

The traffic control entity 800 is also configured to issue a command instructing the identified vehicles to adjust their lateral positions relative the lanes to create a passage along the group of vehicles 802 so as to allow the emergency vehicle 804 to move through said passage. This operation may be performed by a command unit 800C in the traffic control entity 800, e.g. as described for action 204 above.

It should be noted that FIG. 8 illustrates various functional units in the traffic control entity 800, and the skilled person is able to implement these functional units in practice using suitable software and hardware. Thus, the solution is generally not limited to the shown structures of the traffic control entity 800, and the functional units 800A-C therein may be configured to operate according to any of the features and embodiments described in this disclosure, where appropriate.

The functional units 800A-C described above can be implemented in the traffic control entity 800 by means of suitable hardware and program modules of a computer program comprising code means which, when run by the processor P causes the traffic control entity 800 to perform at least some of the above-described actions and procedures.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the traffic control entity 800 in the form of a memory having a computer readable medium and being connected to the processor P. The computer program product or memory in the traffic control entity 800 may thus comprise a computer readable medium on which the computer program is stored e.g. in the form of computer program modules or the like. For example, the memory may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the traffic control entity 800.

The solution described herein may be implemented in the traffic control entity 800 by means of a computer program storage product comprising instructions which, when executed on at least one processor, cause the at least one processor to carry out the actions according to any of the above embodiments, where appropriate.

While the solution has been described with reference to specific exemplifying embodiments, the description is generally only intended to illustrate the inventive concept and should not be taken as limiting the scope of the solution. For example, the terms "traffic control entity", "emergency vehicle", "command", "platoon" and "platoon vehicles" have been used throughout this disclosure, although any other corresponding entities, functions, and/or parameters could also be used having the features and characteristics described here. The solution is defined by the appended claims.

The invention claimed is:

1. A method performed by a traffic control entity for controlling a group of vehicles capable of autonomous driving without requiring a driver, to allow an emergency vehicle to pass the group of vehicles which are travelling concurrently in multiple lanes on a road, the group of vehicles comprising a lead vehicle and non-lead vehicles, the method comprising:
the traffic control entity detecting that the emergency vehicle is approaching the group of vehicles, wherein detecting that the emergency vehicle is approaching the group of vehicles comprises the traffic control entity obtaining position information and movement information, and further wherein the movement information indicates an acceleration of a non-emergency vehicle and/or a deceleration of the non-emergency vehicle;
the traffic control entity identifying the vehicles in the group based at least on the position information and the movement information;
in response to detecting that the emergency vehicle is approaching the group of vehicles, the traffic control entity transmitting towards the identified vehicles a command instructing the identified vehicles to adjust their lateral positions relative the lanes to create a passage along the group of vehicles so as to allow the emergency vehicle to move through said passage;
after transmitting the command, the traffic control entity receiving from the lead vehicle updated position information and updated movement information of at least one non-lead vehicle, wherein the lead vehicle received from said at least one non-lead vehicle the updated position information and the updated movement information; and
as a result of receiving the updated position information and the updated movement information, the traffic control entity transmitting towards the emergency vehicle a message triggering the emergency vehicle to move through the passage.

2. The method of claim 1, wherein
the command instructs a first sub-group of one or more vehicles travelling in a first set of lanes to move in a first lateral direction and a second sub-group of one or more vehicles travelling in a second set of lanes to move in a second lateral direction opposite to the first lateral direction, and
the first and second sub-groups are included in the group of vehicles.

3. The method of claim 1, wherein the command instructs all vehicles in the group to move laterally in the same direction such that the passage is created on one side of the group of vehicles.

4. The method of claim 1, wherein the group of vehicles comprises platoon vehicles operating in a platoon controlled by a lead vehicle (L), and wherein the traffic control entity is configured to transmit the command to the lead vehicle (L) which is thereby enabled to forward the command to the platoon vehicles.

5. The method of claim 4, wherein the platoon vehicles are operating in at least two platoons, each platoon being controlled by a lead vehicle (L), and wherein the traffic control entity is configured to transmit the command to each lead vehicle (L) of the platoons.

6. The method of claim 4, wherein information about current position and movement of the platoon vehicles is received from the lead vehicle (L).

7. The method of claim 1, wherein
at least some of the vehicles in the group are free-style vehicles not operating in a platoon,
the traffic control entity is configured to transmit the command to each of the free-style vehicles, and
the traffic control entity is configured to receive an indication for each vehicle that the emergency vehicle has passed.

8. The method of claim 1, wherein before transmitting the command the traffic control entity is configured to instructs the vehicles in the group to enter emergency mode where said vehicles in the group are configured to act according to the command autonomously without requiring a driver.

9. The method of claim 1, wherein transmitting the command results in the identified vehicles adjusting their lateral positions in a gradual propagating manner.

10. The method of claim 1, wherein
the position information indicates a relative position of the emergency vehicle with respect to the non-emergency vehicle, and
the movement information indicates a relative movement of the emergency vehicle with respect to the non-emergency vehicle.

11. The method of claim 1, wherein the movement information further comprises vehicle proximity distance information indicating a distance measurement with respect to the non-emergency vehicle.

12. The method of claim 1, the method further comprising:

the traffic control entity receiving a message indicating that the emergency vehicle has passed the group of vehicles; and after receiving the message, the traffic control entity transmitting toward at least one vehicle included in the group of vehicles a command triggering said at least one vehicle to re- adjust its lateral position.

13. The method of claim 1, further comprising:

the traffic control entity receiving from the lead vehicle information indicating that the emergency vehicle has passed the lead vehicle, wherein the lead vehicle received from said at least one non-lead vehicle the information indicating that the emergency vehicle has pass the lead vehicle and forwarded the received information to the traffic control entity.

14. A traffic control entity arranged to control a group of vehicles capable of autonomous driving without requiring a driver, to allow an emergency vehicle to pass the group of vehicles when the vehicles in the group are travelling concurrently in multiple lanes on a road, the group of vehicles comprising a lead vehicle and non-lead vehicles, wherein the traffic control entity is configured to:

detect that the emergency vehicle is approaching the group of vehicles, wherein detecting that the emergency vehicle is approaching the group of vehicles comprises the traffic control entity obtaining position information and movement information, and further wherein the movement information indicates an acceleration of a non-emergency vehicle and/or a deceleration of the non-emergency vehicle;

identify the vehicles in the group based at least on the position information and the movement information;

in response to detecting that the emergency vehicle is approaching the group of vehicles, transmit towards the identified vehicles a command instructing the identified vehicles to adjust their lateral positions relative the lanes to create a passage along the group of vehicles so as to allow the emergency vehicle to move through said passage;

after transmitting the command, receive from the lead vehicle updated position information and updated movement information of at least one non-lead vehicle, wherein the lead vehicle received from said at least one non-lead vehicle the updated position information and the updated movement information; and as a result of receiving the updated position information and the updated movement information, transmit towards the emergency vehicle a message triggering the emergency vehicle to move through the passage.

15. The traffic control entity of claim 14, wherein the command instructs a first sub-group of one or more vehicles travelling in a first set of lanes to move in a first lateral direction and a second sub-group of one or more vehicles travelling in a second set of lanes to move in a second lateral direction opposite to the first lateral direction, and the first and second sub-groups are included in the group of vehicles.

16. The traffic control entity of claim 14, wherein the command instructs all vehicles in the group to move laterally in the same direction such that the passage is created on one side of the group of vehicles.

17. The traffic control entity of claim 14, wherein the traffic control entity is configured to receive the position information and the movement information from the identified vehicles when detected by a positioning function in each of the identified vehicles.

18. The traffic control entity of claim 14, wherein the group of vehicles comprises platoon vehicles operating in a platoon controlled by a lead vehicle (L), and wherein the traffic control entity is configured to transmits the command to the lead vehicle (L) which is thereby enabled to forward the command to the platoon vehicles.

19. The traffic control entity of claim 18, wherein the platoon vehicles are operating in at least two platoons, each platoon being controlled by a lead vehicle (L), and wherein the traffic control entity is configured to transmit the command to each lead vehicle (L) of the platoons.

20. The traffic control entity of claim 18, wherein the traffic control entity is configured to receive information about current position and movement of the platoon vehicles from the lead vehicle (L).

21. The traffic control entity of claim 14, wherein at least some of the vehicles in the group are free-style vehicles not operating in a platoon, the traffic control entity is configured to transmit the command to each of the free-style vehicles, and the traffic control entity is configured to receive an indication for each vehicle that the emergency vehicle has passed.

22. The traffic control entity of claim 14, wherein before transmitting the command the traffic control entity is configured to instruct the vehicles in the group to enter emergency mode where said vehicles in the group are configured to act according to the command autonomously without requiring a driver.

23. A computer program storage product comprising a non- transitory computer readable medium storing instructions which, when executed on at least one processor, cause the at least one processor to carry out a method, the method being performed by a traffic control entity for controlling a group of vehicles capable of autonomous driving without requiring a driver, to allow an emergency vehicle to pass the group of vehicles which are travelling concurrently in multiple lanes on a road, the group of vehicles comprising a lead vehicle and non-lead vehicles, the method comprising:

the traffic control entity detecting that the emergency vehicle is approaching the group of vehicles, wherein detecting that the emergency vehicle is approaching the group of vehicles comprises the traffic control entity obtaining position information and movement information and further wherein the movement information indicates an acceleration of a non-emergency vehicle and/or a deceleration of the non-emergency vehicle;

the traffic control entity identifying the vehicles in the group based at least on the position information and the movement information;

in response to detecting that the emergency vehicle is approaching the group of vehicles, the traffic control entity transmitting towards the identified vehicles a command instructing the identified vehicles to adjust their lateral positions relative the lanes to create a passage along the group of vehicles so as to allow the emergency vehicle to move through said passage;

after transmitting the command, the traffic control entity receiving from the lead vehicle updated position information and updated movement information of at least one non-lead vehicle, wherein the lead vehicle received from said at least one non-lead vehicle the updated position information and the updated movement information; and as a result of receiving the updated position information and the updated movement information, the traffic control entity transmitting towards the emergency vehicle a message triggering the emergency vehicle to move through the passage.

24. The computer program storage product of claim 23, wherein the method further comprises:
before transmitting the command, instructing the vehicles in the group to enter an emergency mode in which the vehicles in the group are configured to act according to the command autonomously without driver intervention.

* * * * *